US012800816B2

(12) United States Patent
Edwards

(10) Patent No.: US 12,800,816 B2
(45) Date of Patent: Nov. 17, 2026

(54) OPTICAL STACK

(71) Applicant: 3M INNOVATIVE PROPERTIES COMPANY, St. Paul, MN (US)

(72) Inventor: Jathan D. Edwards, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 187 days.

(21) Appl. No.: 18/934,363

(22) Filed: Nov. 1, 2024

(65) Prior Publication Data

US 2025/0060521 A1 Feb. 20, 2025

Related U.S. Application Data

(62) Division of application No. 17/309,244, filed as application No. PCT/IB2019/060903 on Dec. 17, 2019, now Pat. No. 12,164,132.

(60) Provisional application No. 62/781,065, filed on Dec. 18, 2018.

(51) Int. Cl.

| | |
|---|---|
| ***G02B 5/30*** | (2006.01) |
| ***B32B 7/00*** | (2019.01) |
| ***B32B 7/02*** | (2019.01) |
| ***B32B 7/023*** | (2019.01) |
| ***B32B 7/12*** | (2006.01) |
| ***B32B 17/10*** | (2006.01) |
| ***B60J 1/02*** | (2006.01) |
| ***G02B 5/20*** | (2006.01) |
| ***G02B 5/28*** | (2006.01) |

(52) U.S. Cl.

CPC ................ *G02B 5/305* (2013.01); *B32B 7/00* (2013.01); *B32B 7/023* (2019.01); *B32B 7/12* (2013.01); *B32B 17/10036* (2013.01); *B32B 17/10458* (2013.01); *B60J 1/02* (2013.01); *G02B 5/208* (2013.01); *G02B 5/281* (2013.01); *B32B 7/02* (2013.01); *B32B 2307/402* (2013.01); *B32B 2307/416* (2013.01); *B32B 2307/42* (2013.01); *B32B 2605/00* (2013.01)

(58) Field of Classification Search

CPC ....... G02B 5/281–5/282; G02B 5/3066; B32B 7/00–7/14; B32B 17/00–17/1099

See application file for complete search history.

(56) References Cited

U.S. PATENT DOCUMENTS

| | | | |
|---|---|---|---|
| 3,610,729 | A | 10/1971 | Rogers |
| 4,446,305 | A | 5/1984 | Rogers et al. |
| 4,540,623 | A | 9/1985 | Im et al. |
| 5,103,337 | A | 4/1992 | Schrenk et al. |
| 5,360,659 | A | 11/1994 | Arends et al. |
| 5,448,404 | A | 9/1995 | Schrenk et al. |

(Continued)

FOREIGN PATENT DOCUMENTS

| | | | |
|---|---|---|---|
| CN | 105936167 | A | 9/2016 |
| FR | 2967117 | A1 | 5/2012 |

(Continued)

OTHER PUBLICATIONS

International Search Report for PCT International Application No. PCT/IB2019/060903, mailed on Apr. 7, 2020, 3 pages.

(Continued)

*Primary Examiner* — Prashant J Khatri

(74) *Attorney, Agent, or Firm* — Clifton F. Richardson; Theresa Stadheim

(57) ABSTRACT

Optical stacks are described that include a reflective polarizer disposed between an infrared reflector and an infrared absorber.

3 Claims, 4 Drawing Sheets

(56) References Cited

U.S. PATENT DOCUMENTS

| | | | |
|---|---|---|---|
| 5,882,774 | A | 3/1999 | Jonza et al. |
| 6,157,490 | A | 12/2000 | Wheatley et al. |
| 6,368,699 | B1 | 4/2002 | Gilbert et al. |
| 6,531,230 | B1 | 3/2003 | Weber et al. |
| 6,783,349 | B2 | 8/2004 | Neavin et al. |
| 9,630,356 | B2 | 4/2017 | Neavin et al. |
| 10,895,676 | B2 | 1/2021 | Johnson et al. |
| 2003/0186162 | A1 | 10/2003 | Takahashi et al. |
| 2004/0135742 | A1 | 7/2004 | Weber et al. |
| 2007/0135534 | A1 | 6/2007 | Fisher et al. |
| 2007/0248809 | A1 | 10/2007 | Haldeman et al. |
| 2008/0160321 | A1 | 7/2008 | Padiyath et al. |
| 2010/0316852 | A1 | 12/2010 | Condo et al. |
| 2017/0235030 | A1 | 8/2017 | Tanaka et al. |

FOREIGN PATENT DOCUMENTS

| | | | |
|---|---|---|---|
| JP | 2008006898 | A | 1/2008 |
| JP | 2012203123 | A | 10/2012 |
| JP | 2013001611 | A | 1/2013 |
| WO | 1995017303 | A1 | 6/1995 |
| WO | 1999039224 | A1 | 8/1999 |
| WO | 2017136272 | A1 | 8/2017 |
| WO | 2019145860 | A1 | 8/2019 |
| WO | 2020016703 | A2 | 1/2020 |

OTHER PUBLICATIONS

Macleod, Thin-Film Optical Filters, 2nd Edition, 1986, pp. 1-5.
Thelan, “Design of Optical Interference Coatings”, 1989, pp. 1-5.
Weber, “Giant Birefringent Optics in Multilayer Polymer Mirrors”, Science, Mar. 2000, vol. 287, pp. 2451-2456.

OPTICAL STACK

CROSS REFERENCE TO RELATED APPLICATIONS

This application is a divisional of U.S. application Ser. No. 17/309,244, filed May 11, 2021, now allowed, which is a US 371 application based on PCT/IB2019/060903, filed on Dec. 17, 2019, which claims the benefit of U.S. Provisional Application No. 62/781,065, filed Dec. 18, 2018, the disclosures of which are incorporated by reference in their entireties herein.

BACKGROUND

Multilayer reflective polarizers are optical films generally formed of alternating polymer layers, oriented such that the difference in refractive indices between the alternating polymer layers cause light of one orthogonal polarization to be substantially reflected, while the other is substantially transmitted. Through layer stack design and material selection, the multilayer reflective polarizer can polarize light over a desired range of visible and infrared wavelengths. Infrared reflectors reflect light in the infrared range, and may be transparent or substantially transparent in other wavelength ranges, such as the visible range. Infrared absorbers absorb light in the infrared range, and may be transparent or substantially transparent in other wavelength ranges, such as the visible range.

SUMMARY

In one aspect, the present description relates to an optical stack. The optical stack includes an infrared reflector portion and an infrared absorber portion disposed on the infrared reflector portion. For substantially normally incident light of at least a first wavelength in a first wavelength range extending at least from about 900 nm to about 1200 nm and for each of orthogonal first and second polarization states, the infrared reflector portion reflects at least 60% of the incident light and the infrared absorber portion absorbs at least 60% of the incident light. The optical stack further includes a reflective polarizer portion disposed between the infrared reflector portion and the infrared absorber portion. For substantially normally incident light of at least a second wavelength in a second wavelength range extending at least from about 450 nm to about 700 nm, the reflective polarizer portion reflects at least 80% of the incident light having the first polarization state and transmits at least 80% of the incident light having the second polarization state.

In some aspects, the infrared absorber portion is incorporated as dyes or pigments.

In another aspect, the present description relates to a vehicle. The vehicle includes a windshield which includes a glass layer and an optical stack. The optical stack includes an infrared reflector portion and an infrared absorber portion disposed on the infrared reflector portion. For substantially normally incident light of at least a first wavelength in a first wavelength range extending at least from about 900 nm to about 1200 nm and for each of orthogonal first and second polarization states, the infrared reflector portion reflects at least 60% of the incident light and the infrared absorber portion absorbs at least 60% of the incident light. A light source is disposed within the vehicle and is configured to emit light at the first wavelength towards the optical stack, such that the infrared absorber portion of the optical stack is disposed between the infrared reflector portion and the light source.

In another aspect, the present description relates to a vehicle. The vehicle includes a windshield which includes a first glass layer facing towards an exterior surface of the windshield. The windshield further includes an optical stack having an infrared reflector portion and an infrared absorber portion disposed on the infrared reflector portion. The windshield also includes a second glass layer facing towards cabin of the vehicle. The infrared reflector portion is adjacent to the first glass layer and the infrared absorber portion is adjacent to the second glass layer and the optical stack is disposed in between the first glass layer and second glass layer. For substantially normally incident light and for at least a first wavelength in a first wavelength range extending at least from about 900 nm to about 1200 nm and for each of orthogonal first and second polarization states, the infrared reflector portion reflects at least 60% of the incident light and the infrared absorber portion absorbs at least 60% of the incident light. A light source is disposed within the vehicle and is configured to emit light at the first wavelength towards the optical stack, such that the infrared absorber portion of the optical stack absorbs the light to heat the windshield.

In some aspects, the light source is interfaced with an electronic control unit (ECU) of the vehicle. The ECU is configured to selectively operate the light source based one or more conditions. The one or more conditions is at least one of a trigger by a user of the vehicle and a trigger from a cabin management module of the vehicle.

In another aspect, the present description relates to a method of forming an optical stack. The method includes providing an infrared reflector portion and disposing an infrared absorber portion on the infrared reflector portion. For substantially normally incident light and for at least a first wavelength in a first wavelength range extending at least from about 900 nm to about 1200 nm and for each of orthogonal first and second polarization states, the infrared reflector portion reflects at least 60% of the incident light and the infrared absorber portion absorbs at least 60% of the incident light. The method further includes disposing a reflective polarizer portion between the infrared reflector portion and the infrared absorber portion. For substantially normally incident light and for at least a second wavelength in a second wavelength range extending at least from about 450 nm to about 700 nm, the reflective polarizer portion reflects at least 80% of the incident light having the first polarization state and transmits at least 80% of the incident light having the second polarization state.

In some aspects, the infrared absorber portion is an additional layer laminated to the optical stack post co-extrusion of the infrared reflector portion and the reflective polarizer portion. The infrared absorber portion is incorporated as dyes or pigments in one of the layers during co-extrusion of the infrared reflector portion and the reflective polarizer portion.

DETAILED DESCRIPTION

Figure 1:
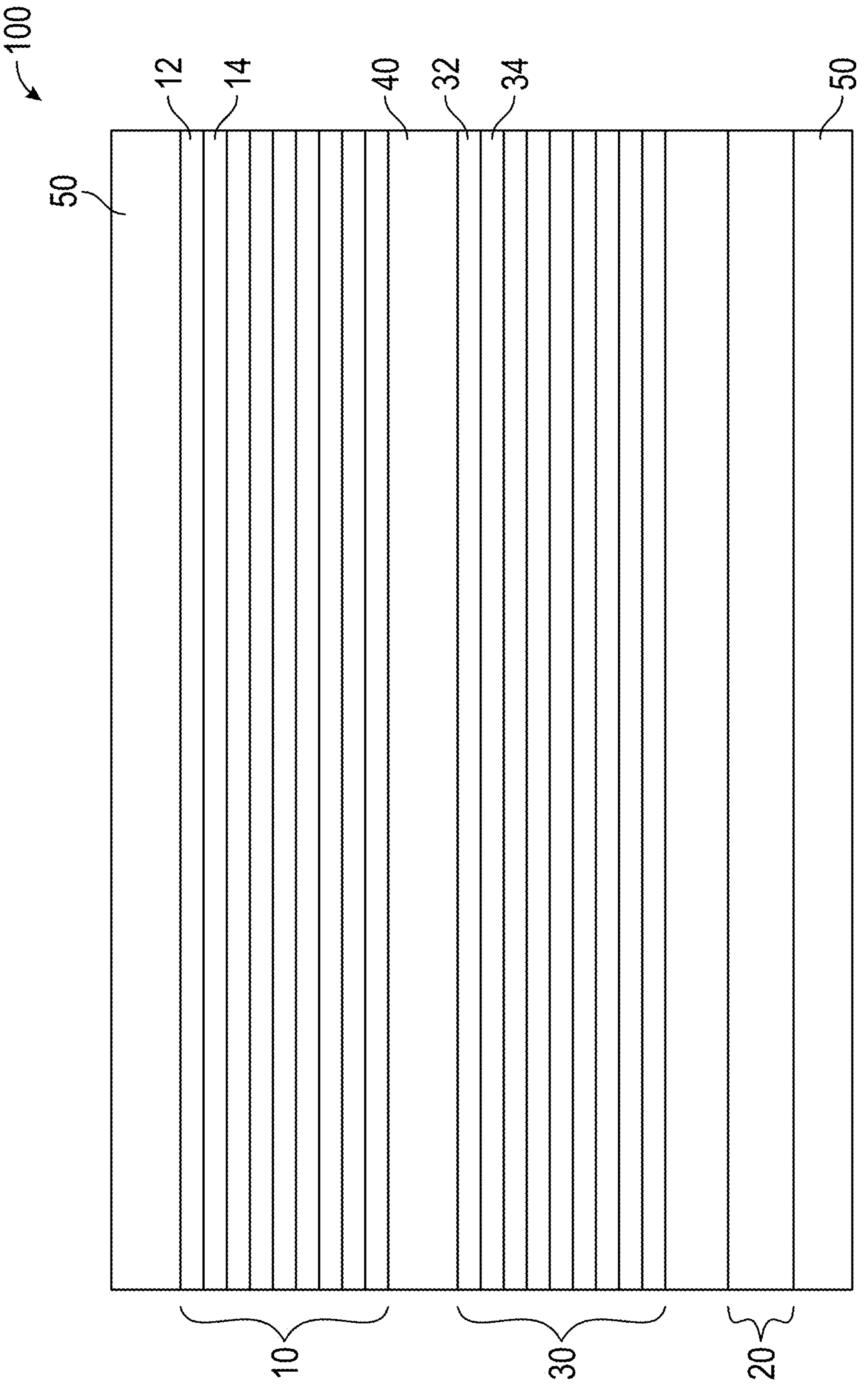
FIG. 1 is a side elevation cross-section of an optical stack.

An optical stack may include multilayer optical films that provide desirable transmission and/or reflection properties, at least partially by an arrangement of microlayers of differing refractive index. It has been known to make such multilayer optical films by depositing a sequence of inorganic materials in optically thin layers ("microlayers") on a substrate in a vacuum chamber. Inorganic multilayer optical films are described, for example, in textbooks by H. A. Macleod, *Thin-Film Optical Filters,* 2nd Ed., Macmillan Publishing Co. (1986) and by A. Thelan, *Design of Optical Interference Filters*, McGraw-Hill, Inc. (1989).

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 μm. Thicker layers may be included, such as skin layers at the outer surfaces of the multilayer optical film, or protective boundary layers (PBLs) disposed within the multilayer optical films, that separate coherent groupings (referred to herein as "packets") of microlayers.

For polarizing applications, e.g., for reflective polarizers, at least some of the optical layers are formed using birefringent polymers, in which the polymer's index of refraction has differing values along orthogonal Cartesian axes of the polymer. Generally, birefringent polymer microlayers have their orthogonal Cartesian axes defined by the normal to the layer plane (z-axis), with the x-axis and y-axis lying within the layer plane. Birefringent polymers can also be used in non-polarizing applications.

In some cases, the microlayers have thicknesses and refractive index values corresponding to a ¼-wave stack, i.e., arranged in optical repeat units or unit cells each having two adjacent microlayers of equal optical thickness (f-ratio=50%), such optical repeat unit being effective to reflect by constructive interference light whose wavelength λ is twice the overall optical thickness of the optical repeat unit. Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. See, e.g., U.S. Pat. No. 5,360,659 (Arends et al.) and U.S. Pat. No. 5,103,337 (Schrenk et al.). Thickness gradients along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

Further details of multilayer optical films and related designs and constructions are discussed in U.S. Pat. No. 5,882,774 (Jonza et al.) and U.S. Pat. No. 6,531,230 (Weber et al.), PCT Publications WO 95/17303 (Ouderkirk et al.) and WO 99/39224 (Ouderkirk et al.), and the publication entitled "Giant Birefringent Optics in Multilayer Polymer Mirrors". Science. Vol. 287. March 2000 (Weber et al.). The multilayer optical films and related articles can include additional layers and coatings selected for their optical, mechanical, and/or chemical properties. For example, a UV absorbing layer can be added at the incident side of the film to protect components from degradation caused by UV light. The multilayer optical films can be attached to mechanically reinforcing layers using a UV-curable acrylate adhesive or other suitable material. Such reinforcing layers may include polymers such as PET or polycarbonate, and may also include structured surfaces that provide optical function such as light diffusion or collimation, e.g. by the use of beads or prisms. Additional layers and coatings can also include scratch resistant layers, tear resistant layers, and stiffening agents. See, e.g., U.S. Pat. No. 6,368,699 (Gilbert et al.). Methods and devices for making multilayer optical films are discussed in U.S. Pat. No. 6,783,349 (Neavin et al.).

The reflective and transmissive properties of multilayer optical film are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. For case of explanation in the present patent application, unless otherwise specified, the x-, y-, and 7-axes are assumed to be local Cartesian coordinates applicable to any point of interest on a multilayer optical stack, in which the microlayers extend parallel to the x-y plane, and wherein the x-axis is oriented within the plane of the film to maximize the magnitude of $\Delta n_x$. Hence, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$, i.e., $\Delta n_x \geq 0$.

In practice, the refractive indices are controlled by judicious materials selection and processing conditions. A conventional multilayer film is made by co-extrusion of a large number, e.g. tens or hundreds of layers of two alternating polymers A, B, possibly followed by passing the multilayer extrudate through one or more multiplication die, and then stretching or otherwise orienting the extrudate to form a final film. The resulting film is typically composed of many of individual microlayers—hundreds or many hundreds-whose thicknesses and refractive indices are tailored to provide one or more reflection bands in desired region(s) of the spectrum, such as in the visible or near infrared. To achieve desired reflectivities with a reasonable number of layers, adjacent microlayers typically exhibit a difference in refractive index ($\Delta n_x$) for light polarized along the x-axis of at least 0.04. In some embodiments, materials are selected such that the difference in refractive index for light polarized along the x-axis is as high as possible after orientation. If reflectivity is desired for two orthogonal polarizations, then the adjacent microlayers also can be made to exhibit a difference in refractive index ($\Delta n_y$) for light polarized along the y-axis of at least 0.04.

The '774 (Jonza et al.) patent referenced above describes, among other things, how the refractive index difference ($\Delta n_z$) between adjacent microlayers for light polarized along the z-axis can be tailored to achieve desirable reflectivity properties for the p-polarization component of obliquely incident light. To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5 * \Delta n_x$, or $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

The '774 (Jonza et al.) patent also discusses certain design considerations relating to multilayer optical films configured as polarizers, referred to as multilayer reflecting or reflective polarizers. In many applications, the ideal reflecting polarizer has high reflectance along one axis (the "extinction" or "block" axis) and zero reflectance along the other axis (the "transmission" or "pass" axis). For the purposes of this application, light whose polarization state is substantially aligned with the pass axis or transmission axis is referred to as pass light and light whose polarization state is substantially aligned with the block axis or extinction axis is referred to as block light. Unless otherwise indicated, pass light at 60° incidence is measured in p-polarized pass light. If some reflectivity occurs along the transmission axis, the efficiency of the polarizer at off-normal angles may be reduced, and if the reflectivity is different for various wavelengths, color may be introduced into the transmitted light. Furthermore, exact matching of the two y indices and the two z indices may not be possible in some multilayer systems, and if the z-axis indices are not matched, introduction of a slight mismatch may be desired for in-plane indices n1y and n2y. In particular, by arranging the y-index mismatch to have the same sign as the z-index mismatch, a Brewster effect is produced at the interfaces of the microlayers, to minimize off-axis reflectivity, and therefore off-axis color, along the transmission axis of the multilayer reflecting polarizer.

Another design consideration discussed in '774 (Jonza et al.) relates to surface reflections at the air interfaces of the multilayer reflecting polarizer. Unless the polarizer is laminated on both sides to an existing glass component or to another existing film with clear optical adhesive, such surface reflections will reduce the transmission of light of the desired polarization in the optical system. Thus, in some cases it may be useful to add an antireflection (AR) coating to the reflecting polarizer.

Reflective polarizers are often used in visual display systems such as liquid crystal displays. These systems—now found in a wide variety of electronic devices such as mobile phones, computers including tablets, notebooks, and subnotebooks, and some flat panel TVs—use a liquid crystal (LC) panel illuminated from behind with an extended area backlight. The reflective polarizer is placed over or otherwise incorporated into the backlight to transmit light of a polarization state useable by the LC panel from the backlight to the LC panel. Light of an orthogonal polarization state, which is not useable by the LC panel, is reflected back into the backlight, where it can eventually be reflected back towards the LC panel and at least partially converted to the useable polarization state, thus "recycling" light that would normally be lost, and increasing the resulting brightness and overall efficiency of the display.

In certain embodiments, multilayer reflective polarizers may be useful in automotive applications. For example, multilayer reflective polarizers may be used on or near at least a portion of a vehicle windshield, a side window, or another otherwise transparent or translucent surface, such as industrial windows, architectural windows, skylights, room windows, or the like. This application differs significantly from traditional liquid crystal display applications, because—for safety reasons—a driver should still be able to observe the road or surrounding environment through the multilayer reflective polarizer, or have a minimally interrupted view through the surface. Further, other drivers or observers should not be dazzled or have their vision impaired by a bright reflection off the driver's windshield or another surface. The highly reflective (for one polarization state), high performance traditional reflective polarizer will not provide these desired properties.

Further, previously known multilayer optical films may include layers that may stably endure temperatures needed for windscreen autoclaving process in a vehicle. These multilayer optical films may also include solar blocking functions to protect head-up displays from excessive heating. However, the previously known multilayer optical films may not be efficient, for example when defrosting of a windscreen is necessary.

Multilayer optical films are typically formed from alternating layers of two different polymers. One layer is a layer capable of developing birefringence when oriented. Because almost all polymers used in the formation of multilayer optical films increase in refractive index when stretched, this layer is also typically known as the high index layer (or "high index optics" or HIO). The other layer of the alternating polymer layers is typically an isotropic layer, equal or less than the indices of refraction of the high index layer. For this reason, this layer is typically referred to as the low index layer (or "low index optics" or LIO). Conventionally, the high index layer is crystalline or semi-crystalline, while the low index layer is amorphous. This is at least based on the belief that in order to get high enough block axis reflectivity (based on the mismatch between the high index layer and the low index layer along a certain in-plane direction) and low enough pass axis reflectivity (based on the matching between the high index layer and the low index layer along a second, orthogonal in-plane direction), an amorphous material would be required.

It has now surprisingly been found that a multilayer reflective polarizer with both high index layers and low index layers that have some degree of crystallinity developed during stretching due to the low stretching temperature of polyethylene terephthalate are especially suited for these automotive applications. Additionally, it has surprisingly been found that multilayer reflective polarizers in which both the high index optics and the low index optics both develop asymmetric index of refraction increases through stretching can be useful in automotive application. In some embodiments, each of the high index layers and the low index layers may develop or have an in-plane birefringence of at least 0.04. In some embodiments, along one in-plane direction, the difference between the high index layers and the low index layers may be at least 0.04, but along a second, orthogonal in-plane direction, the difference may be less than 0.04. During certain intermediate stretching steps, certain multilayer optical films may have similar birefringent properties; however, these films were subsequently subject to a heat setting process that minimized the birefringence in at least one of the layers (typically the low index, or isotropic layer) in order to maximize the block axis (stretch axis) reflectivity, meaning the final film (i.e., the film in roll form or the converted film with at least four edges) did not exhibit these properties.

In some embodiments, the high index layers are selected to be polyethylene terephthalate (PET) and the low index layers are selected to be a copolyester of polyethylene terephthalate with cyclohexane dimethanol used as a glycol modifier (PETG, such as available from Eastman Chemicals, Knoxville, Tenn.). In some embodiments, the high index layers are selected to be PET and the low index layers are selected to be a 50:50 blend of PETG and PCTG (also a polyethylene terephthalate with cyclohexane dimethanol as a glycol modifier, but with twice the modifier as for PETG, available from Eastman Chemicals, Knoxville, Tenn.). In some embodiments, the high index layers are selected to be PET and the low index layers are selected to be a 33:33:33 blend of PETG, PCTG, and an "80:20" copolyester having 40 mol % terephthalic acid, 10 mol % isophthalic acid, 49.75 mol % ethylene glycol, and 0.25 mol % trimethyl propanol. Other copolyesters may be useful as or in low index layers described herein.

Reflective polarizers including materials such as the exemplary sets above surprisingly exhibit better inhibition of haze after high temperature exposure, due to the crystallization being developed gradually during processing rather than spontaneously (with accompanying larger crystal sites) during exposure to radiation or heat. Further, cosmetic and appearance issues such as microwrinkle or delamination appear to occur significantly less frequently with the crystalline materials combinations exemplified herein.

Shrinkage—particularly along the direction of greatest stretch—may be larger than conventional reflective polarizers. However, the amount of shrinkage can be controlled by a heat setting step, and in the manufacturing and assembly processes for automotive, a certain amount of shrinkage is desired. In some embodiments, the optical stack may include a reflective polarizer stacked between an infrared reflector and an infrared absorber.

Polymer films including infrared absorbing agents have been demonstrated in US2007013553. The polymer films may include lanthanum hexaboride and an epoxy agent as infrared absorbing agents. The epoxy agent may be selected from the group consisting of aliphatic monoepoxides and aliphatic diepoxides.

Further, FR2967117 discloses windscreen defogging and defrosting device for a car, which has absorbing unit to absorb infrared radiation, and infrared radiation sources arranged on base of joint on which lower edge of windscreen rests. An interlayer including an infrared absorbing agent disposed within a moisture resistant coating is disclosed in US20070248809. JP2008006898 discusses a heat absorbing layer provided in a vehicle interior side to heat the vehicle.

In some embodiments, optical stacks as described herein include different optical packets having different characteristic optical spectra, formed at the same time.

FIG. 1 is a side elevation cross-section of an optical stack 100. The optical stack 100 includes an infrared reflector portion 10, an infrared absorber portion 20 disposed on the infrared reflector portion 10. A reflective polarizer portion 30 is disposed between the infrared reflector portion 10 and the infrared absorber portion 20. Optionally, the optical stack 100 includes skin layers 50 on either ends of the optical stack 100. Further, the optical stack 100 optionally includes a protective boundary layer 40 between the reflective polarizer portion 30 and the infrared reflector portion 10 and another protective boundary layer 40 between the reflective polarizer portion 30 and the infrared absorber portion 20. The optional protective boundary layers 40 between the two portions and optional skin layers 50 protects the alternating optical layers from processing and shear force of extrusion and roller contact. The reflective polarizer portion 30 includes alternating first polymer layers 32 and second polymer layers 34, and infrared reflector portion includes alternating third polymer layers 12 and fourth polymer layers 14.

In a typical optical stack 100 formation processes that include stretching or orientation, the optical axis of optical films made thereby will vary over the crossweb dimension due to asymmetries in the stretching process. The rate of variation will depend on the processing conditions. For films that would include a reflective polarizer portion laminated to an infrared reflector, these optical axes may not be precisely aligned, or even very closely aligned, as the portions of film may come from different web locations or simply may have been subject to different processing conditions. Advantageously, films having portions formed (extruded and stretched) at the same time will necessarily have excellent alignment of their optical axes.

Surprisingly, with suitable materials and processing conditions, films described herein may have a first portion that exhibits reflective polarizer characteristics (more polarization-sensitive reflection: reflecting light of a first polarization more than light having an orthogonal polarization) and a second portion that exhibits infrared reflector characteristics (less polarization-sensitive reflection; more mirror-like: reflecting light of either polarization or unpolarized light at a similar level). Typically, these films would utilize different stretching conditions, for example, stretching in primarily a single direction for a reflective polarizer versus stretching near-evenly in two orthogonal directions for an infrared reflector. In some embodiments, the film is stretched primarily or only in a crossweb direction.

Further, typically oriented multilayer films that lack symmetry in the thickness direction have a tendency to curl once released from tension (e.g., after conversion). This may be due to differences in shrinkage, in thermal expansion, and in hydroscopic expansion between the component materials. Film curl may be a significant problem in downstream processing or handling of the film. For example, if cut pieces of multilayer film are to be cut and laminated to glass, plastic, or sandwiched between two pieces of glass or plastic with an adhesive, such as PVB, film curl can make handling and process slower or less efficient, and may also reduce yield. Surprisingly, films described herein exhibit very low curl.

In some embodiments, reflective polarizer portion 30 includes a plurality of alternating first polymer layers 32 and second polymer layers 34, where for at least one in-plane direction, the difference in refractive index between each of the first polymer layers 32 and the second polymer layers 34 of the reflective polarizer portion 30 is at least 0.04. In some embodiments, for a second in-plane direction orthogonal to the at least one in-plane direction, the difference in refractive index between each of the first polymer layers 32 and the second polymer layers 34 of the reflective polarizer portion 30 is less than 0.04. In some embodiments, infrared reflector portion 10 includes a plurality of alternating third polymer layers 12 and fourth polymer layers 14. The infrared reflector portion 10 reflects at least 60% of normally incident unpolarized light averaged over 900-1200 nm. The infrared reflector portion 10 reflects each of orthogonal first and second polarization states. In some embodiments, the infrared reflector portion 10, on its own, may transmit less than 30% of normally incident unpolarized light averaged over 900-1200 nm. In some embodiments, both the reflective polarizer portion 30 and the infrared reflector portion 10 have more than 200 layers, each. In some embodiments, the infrared absorber portion 20 absorbs at least 60% of normally incident unpolarized light averaged over 900-1200 nm. The infrared absorber portion 20 reflects each of orthogonal first and second polarization states.

One of either first polymer layers 32 and/or second polymer layers 34 may be or include the same material as one of either third polymer layers 12 and/or fourth polymer layers 14. In some embodiments, for the infrared reflector portion 10, the difference in refractive index between each of the third polymer layers 12 and the fourth polymer layers 14 is at least 0.04. In some embodiments, for two orthogonal in-plane direction, the difference in refractive index in between each pair of the third polymer layers 12 and the fourth polymer layers 14 is greater than the difference in refractive index between each pair of the first polymer layers 32 and the second polymer layers 34 along the second in-plane direction. In some embodiments, each of first polymer layers 32 and second polymer layers 34 of reflective polarizer portion 30 has an in-plane birefringence of at least 0.01. In some embodiments, each of the first polymer layers 32 and the second polymer layers 34 has an in-plane birefringence of at least 0.02. In some embodiments, each of the first polymer layers 32 and the second polymer layers 34 has an in-plane birefringence of at least 0.04. In some embodiments, the reflective polarizer portion 30 reflects at least 80% of the incident light having the first polarization state in a wavelength range of normally incident light averaged over 450-700 nm. In some embodiments, the reflective polarizer portion 30 transmits at least 80% of the incident light having the second polarization state in a wavelength range of normally incident light averaged over 450-700 nm.

Optical stack 100 described herein may include one or more additional layers or coatings. For example, the optical stack 100 may further include a hardcoat. In some embodiments, the optical stack 100 may further include a retarder layer, such as a quarter-wave or half-wave retarder. In some embodiments, the optical stack 100 may include an optically clear adhesive layer and, in some embodiments, a protective paper or plastic liner. In some embodiments, the optical stack 100 may include an ultraviolet absorber component in any of its layers or in, for example, an adhesive.

Figure 2:
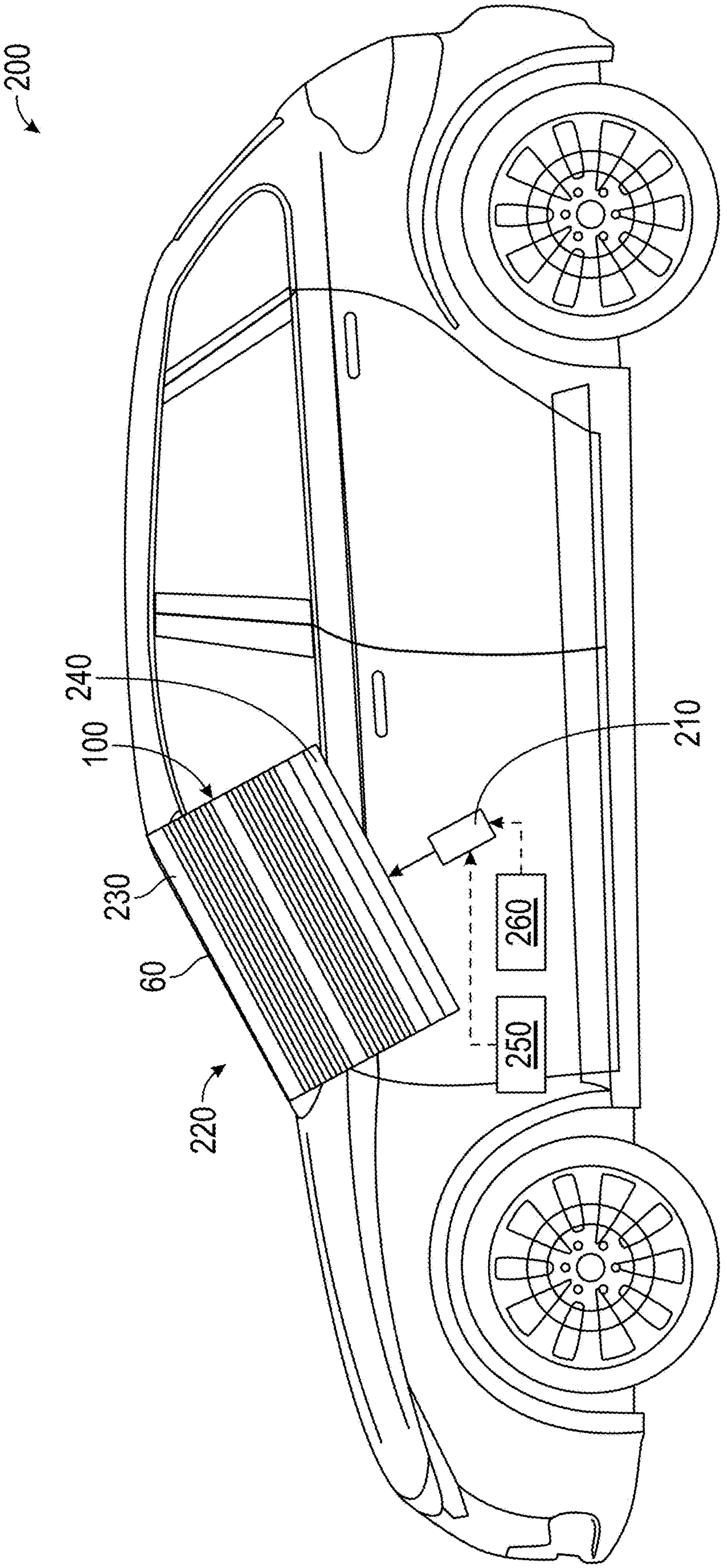
FIG. 2 is a schematic side elevation of a vehicle, where the optical stack of Example 1 is implemented.

When used on an automotive windshield 220 or other vehicle window as shown in FIG. 2, the optical stack 100 may be disposed on an interior side of the windshield 220, on an exterior side of the windshield 220, or between two layers of the windshield 220—first glass layer 230 and second glass layer 240 of laminated windshield 220. In some embodiments, the windshield 220 may be referred as a glass layer 60, and the glass layer 60 may be curved. In some embodiments, the optical stack 100 may be disposed such that the infrared absorber portion 20 is oriented farthest from an exterior surface of the automotive windshield 220 than the infrared reflector portion 10. The vehicle 200 may include a light source 210 configured to emit light at wavelength range averaged over 900-1200 nm, towards the optical stack 100, such that the infrared absorber portion 20 of the optical stack 100 is disposed between the infrared reflector portion 10 and the light source 210. The infrared absorber portion 20 of the optical stack 100 absorbs the light from the light source 210 to heat the windshield 220. The light source 210 may be selectively operated through an Electronic Control Unit (ECU) 250 of the vehicle 200. The ECU 250 may operate the light source 210 based on at least one of trigger by a user of the vehicle 200 or trigger from a cabin management module 260 of the vehicle 200. The dotted lines in FIG. 2 represent the trigger signals that may be transmitted from the ECU 250 and the cabin management module 260 to the light source 210.

In some embodiments, the infrared absorber portion 20 may be an additional layer added to the infrared reflector portion 10 and the reflective polarizer portion 30. The additional layer may be laminated post co-extrusion of the infrared reflector portion 10 and the reflective polarizer portion 30. The additional layer may be a coating applied after co-extrusion of the infrared reflector portion 10 and the reflective polarizer portion 30. In some embodiments, the infrared absorber portion 20 may be incorporated by near infrared dyes or pigments in one of the layers formed during co-extrusion or in the skin layer 50.

Several compositions of visibly transparent infrared absorbing transparent conducting oxides have been documented in prior art both as thin films and nanoparticle powders and dispersions. Some of the more well-known TCOs are Indium tin oxide (ITO), Antimony tin oxide (ATO), Gallium tin oxide (GTO), Antimony zinc oxide (AZO), Aluminum/Indium doped Zinc oxide, Doped tungsten oxides like Cesium tungsten oxides, Tungsten blue oxides. Many of these nanoparticles are available from Nissan Chemical, Nagase, Sumitomo Metal and Mining, Evonik.

Other visibly transparent IR absorbers which are non-oxides are metal borides like Lanthanum hexaborides, conducting polymer nanoparticles like PEDOT-PSS.

Metal chalcogenides like metal sulfides, selenides also absorb infrared for example copper sulfide and copper selenide nanoparticles, tungsten disulfides and molybdenum disulfides.

Yet another class of visibly transparent tunable IR absorbers are metallic plasmonic nanoparticles such as those made of gold, silver copper etc.

A different class of materials are NIR dyes and pigments. These dyes have low visible absorption but strong narrow band IR absorption. Many of these dyes and pigments are organic/organometallic or metal organic in nature. Some of major classes of dyes/pigments include phthalocyanines, cyanine, transitional metal dithioline, squarilium, croconium, quniones, anthraquinones, iminium, pyriliu, thiapyrilium, azulenium, azo, perylene and indoanilines. Many of these dyes/pigments can exhibit both visible and/or IR absorption as well.

There are many different types of visible dyes and colorants and they fall in one or more classes like acid dyes, azoic coloring matters, coupling components, diazo components, basic dyes include developers, direct dyes, disperse dyes, fluorescent brightners, food dyes, ingrain dyes, leather dyes, mordant dyes, natural dyes and pigments, oxidation bases, pigments, reactive dyes, reducing agents, solvent dyes, sulfur dyes, condense sulfur dyes, vat dyes.

Some of the organic pigments belong to one of more monoazo, azo condensation Insoluble metal salts of acid dyes and disazo, naphthols, arylides, diarylides, pyrazolone, acetoarylides, naphthanilides, phthalocyanines, anthraquinone, perylene, flavanthrone, triphendioxazine, metal complexes, quinacridone, polypryrrolopyrrole etc.

Metal chromates, molybdates, titanates, tungstates, aluminates, ferrites, are some of the common pigments. Many contain transition metals like iron, managanese, nickel, titanium, vanadium, antimony, cobalt, lead, cadmium, chromium etc. Bismuth vanadates are non-cadmium yellows. These pigments can be milled to create nanoparticles which can be useful where transparency and low scattering is desired.

Reflective polarizers with crystallinity in both the high index and the low index layers also perform better with respect to chemical resistance and permeability (edge ingress) of other materials.

Reflective polarizers as described herein are useful for automotive applications, but can also be used or suitable for certain polarizing beam splitter/view combiner applications. For example, for certain augmented reality displays or display devices, a generated and projected image may be superimposed over a wearer's frame of view. Many of the advantages that may be suitable for, for example, a heads up display for automotive applications, may be similarly desirable in these augmented reality applications.

EXAMPLES

An optical stack having a multilayer optical film designed to provide combined functions for windscreen display and solar blocking film is described herein. Thus, the single co-extruded film is required to simultaneously provide a p-polarization reflection in the visible for windscreen display and strong solar rejection in the near-infrared wavelengths. For comparison, the physical properties of a weak, polyester/co-polyester based reflective polarizer, and Ultra-Clear Solar Film (UCSF) (an infrared reflector), available from 3M Company (St Paul, MN, USA), are described in the Tables below.

Testing Methods

Machine direction (MD) labelling represents results for this multilayer optical film in the orientation of the extrusion direction. Transverse direction (TD) represents results for the film orthogonal to the extrusion direction. Dynamic mechanical analysis (DMA) is a testing technique and related analytical instrument that measures the physical properties of solids and polymer melts, reports modulus and damping, and is programmable to measure force, stress, strain, frequency and temperature. Thermomechanical analysis (TMA) is a common measurement of sample displacement (growth, shrinkage, movement, etc.) as a function of temperature, time and applied force. Traditionally, TMA is used to characterize linear expansion, glass transitions, and softening points of materials by applying a constant force to a specimen while varying temperature.

TABLE 1

Measured properties for UCSF

| Measurement | Orientation | Result | Unit | Replicates | Test Methods |
|---|---|---|---|---|---|
| **Mechanical** | | | | | |
| Tensile Strength | MD | 158 | MPa | 5 | ASTM D882: |
| | TD | 186 | MPa | 5 | 0.5 mm/(mm * min) |
| Elongation at break | MD | 138 | % | 5 | strain rate |
| | TD | 99 | % | 5 | |
| Storage Modulus | MD | 3.4 | GPa | 3 | DMA: (2° C./minute, |
| (25° C.) | TD | 4.1 | GPa | 3 | 0.1% strain, 1 Hz) |
| Storage Modulus | MD | 2.1 | GPa | 3 | |
| (85° C.) | TD | 2.6 | GPa | 3 | |
| **Thermal** | | | | | |
| Shrinkage (85° C./ 30 minutes) | MD | .28 | % | 3 | TMA: (5° C./minute, hold 85° C. for 30 minutes, 25° C. reference, initial RH <20%, 24 mm length |
| | TD | .18 | % | 3 | |
| Coefficient of Thermal Expansion (0-85° C.) | MD | 38.6 | $10^{-6}$/° C. | 3 | TMA: (5° C./minute, 120 to −25° C., 25° C. reference, initial RH <20%, 24 mm length |
| | TD | 28.6 | $10^{-6}$/° C. | 3 | |
| $T_g$ | N/A | 95 | ° C. | 6 | DMA: (2° C./minute, 0.1% strain, 1 Hz, storage modulus onset temperature) |
| **Hygroscopic** | | | | | |
| Coefficient of hygroscopic expansion | MD | 13.2 | ppm/% RH | 2 | DMA: 25° C., 20%-80% RH steady-state |
| | TD | 11.3 | ppm/% RH | 2 | |

TABLE 2

Measured properties for single packet, p-polarization reflective polarizer

| Measurement | Orientation | Result | Unit | Replicates | Test Methods |
|---|---|---|---|---|---|
| Thermal measurements for first, single packet, reflective polarizer having low index layer of PETg GN071 (from Eastman chemicals). | | | | | |
| Shrinkage (150° C./30 minutes) | MD | 1.97 | % | 2 | TMA: 5° C./minute ramping, hold 150° C. for 30 minutes, 25° C. reference, initial RH <20%, 24 mm length |
| | TD | 1.87 | % | 2 | |
| Coefficient of Thermal Expansion (95-0° C.) | MD | 81.5 | $10^{-6}$/° C. | 2 | TMA: 5° C./minute ramping, 170° C. to −20° C., 25° C. reference, initial RH <20%, 24 mm length |
| | TD | 11.2 | $10^{-6}$/° C. | 2 | |
| Coefficient of Thermal Expansion (125-95° C.) | MD | 104.1 | $10^{-6}$/° C. | 2 | TMA: 5° C./minute ramping, 170° C. to −20° C., 25° C. reference, initial RH <20%, 24 mm length |
| | TD | 19.5 | $10^{-6}$/° C. | 2 | |
| Thermal measurements for second, single packet reflective polarizer having F-ratio of 0.75 and the low index layer made up of a 33:33:33 blend of Polyethylene Terephthalate Glycol (PETG) GN071 from Eastman, VM318D PCTg from Eastman, and 80:20 CoPET. The 80:20 CoPET is a pelletized an amorphous copolyester comprised of a molar ratio of the following: 40 mol % terephthalic, 10 mol % isophthalic, 49.75 mol % ethylene glycol, 0.25 mol % trimethyl propanol | | | | | |
| Shrinkage (150° C./30 minutes) | MD | 2.03 | % | 2 | TMA: 5° C./minute ramping, hold 150° C. for 30 minutes, 25° C. reference, initial RH <20%, 24 mm length |
| | TD | 1.81 | % | 2 | |
| Coefficient of Thermal Expansion (95-0° C.) | MD | 80.1 | $10^{-6}$/° C. | 2 | TMA: 5° C./minute ramping, 170° C. to −20° C., 25° C. reference, initial RH <20%, 24 mm length |
| | TD | 10.3 | $10^{-6}$/° C. | 2 | |
| Coefficient of Thermal Expansion (125-95° C.) | MD | 104.9 | $10^{-6}$/° C. | 2 | TMA: 5° C./minute ramping, 170° C. to −20° C., 25° C. reference, initial RH <20%, 24 mm length |
| | TD | 24.0 | $10^{-6}$/° C. | 2 | |

In Tables 1 and 2, the coefficients of thermal and hygroscopic expansion are shown for biaxially-oriented UCSF and also for the uniaxially-oriented p-pol reflective polarizer. The properties are very different in the machine direction compared to transverse direction for the reflective polarizer, and yet very similar in both directions for the biaxial film.

Example 1

A multifunctional windscreen display and solar film was prepared as follows. Two independent multilayer packets of 325 layers each were coextruded using a feedblock system as described in U.S. Pat. No. 9,630,356 (Neavin et al.), which includes skin layers, draw ratios and tentering processes suitable for the coextrusion process used for these examples. The "f-ratio," as described herein, refers to the ratio of the optical thickness of a constituent layer with highest optical index, "A", to the optical thickness of the complete optical repeat unit (including of layers A+B).

Three polymers were used for the optical layers. The first polymer (first optical layers) was purified terephthalic acid (PTA) based polyethylene terephthalate with an intrinsic viscosity of 0.72. The second polymer (second optical layers) was polyethylene terephthalate glycol (PETG) GN071 from Eastman Chemical (Kingsport, TN, USA). The third polymer was CA-24 co-PMMA available from Plaskolite (Columbus, OH, USA). The first packet used only the first and second polymers, namely PET and PETG. The second packet used the first and third polymers namely, PETG and co-PMMA. The ratio of the feed rate in the first packet of the first polymer to the second polymer was chosen to make the optical layers have an f-ratio of 0.50. The ratio of the feed rate in the second packet of the first polymer to the third polymer was chosen to make the optical layers have a f-ratio of 0.496. The polymer used for the skin layers was EASTAPAK PET 7352 available from Eastman Chemical (Kingsport, TN, USA). The materials were fed from separate extruders to a multilayer coextrusion feedblock, in which they were assembled into two packets of 325 alternating optical layers, plus a thicker protective boundary layer of the first optical layers, on each side, for a total of 654 layers. The skin layers of the first optical layer material were added to the construction in a manifold specific to that purpose, resulting in a final construction having 656 layers. The multilayer melt was then cast through a film die onto a chill roll, in the conventional manner for polyester films, upon which it was quenched. The cast web was then stretched in a commercial scale linear tenter at a draw ratio approximately 7:1 and a temperature of 228° F. in the stretching section. The heat set section had a temperature of 350° F.

Before this film was produced there was concern about the hydrodynamic flow stability for this process being insufficient for producing perfectly parallel layers with flat interfaces and no layer break-up. However, the resulting material choices for the three polymer materials, however, provided compatible rheologies for this co-extrusion process to provide a generally flat, two packet, uniaxially stretched multilayer optical film.

The multilayer film of Example 1 (without coatings) was wound on a roll with an outside diameter of about 15 inches with the first packet on the outside of the roll. Forty-nine days later the film was evaluated for curl by cutting a 3 inch by 3 inch square of film with one edge in the MD and one edge in TD. The film was from the outside wraps of the roll and half way between the edges of the film. The square of film was placed on a flat surface with packet 1 down and the height each of the corners was measured to be 1.5 millimeters. The edges in the MD were straight while the edges in the TD were curved providing the 1.5 millimeters of corner lift. Sheets of the film were easily handled and curl was not an issue when creating laminated glazing using the multilayer film.

Optical Test and Shrinkage Test Results

Figure 3:
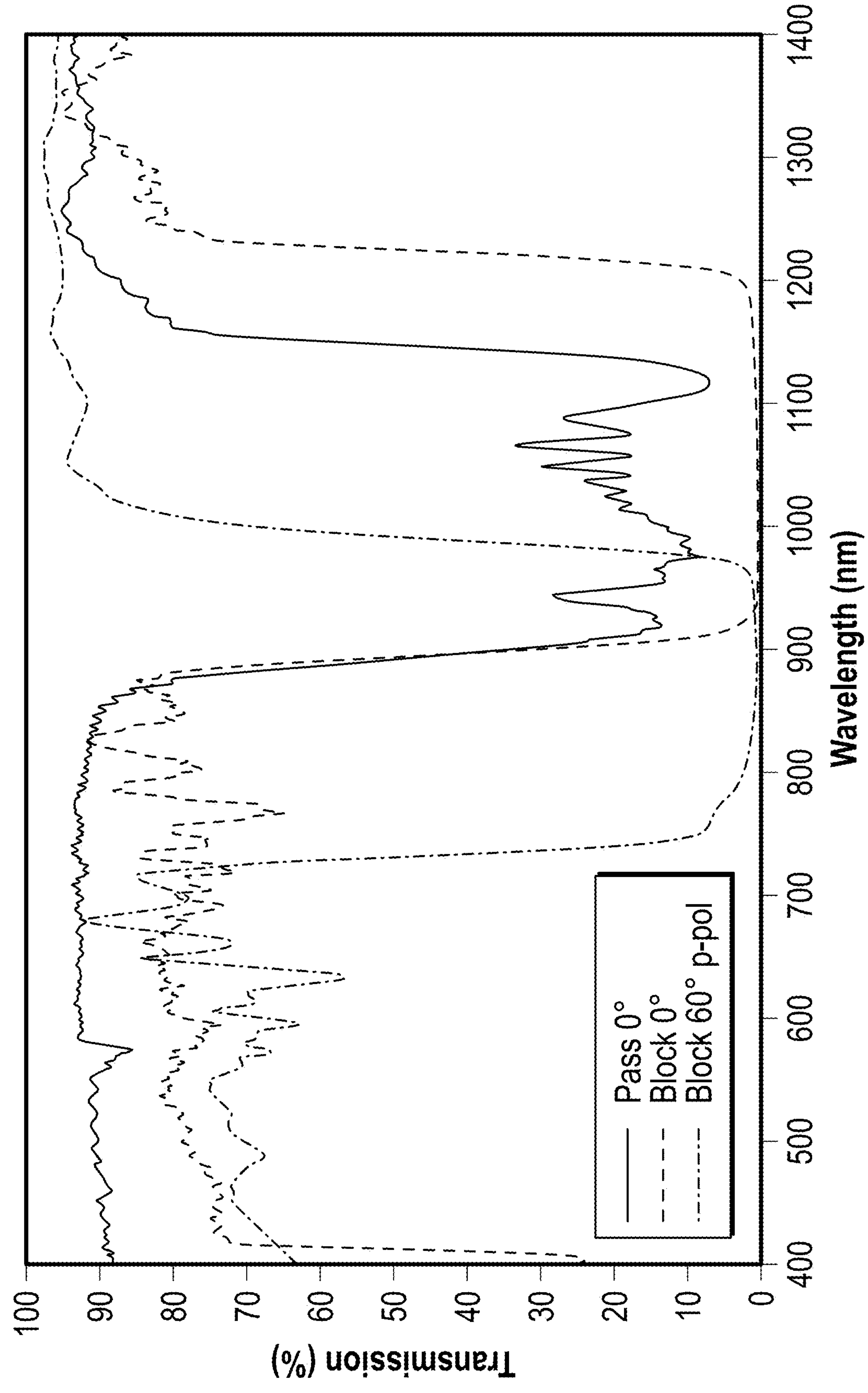
FIG. 3 is a graph showing pass and block state transmission spectra for the optical stack of Example 1.

The layer profile, first polymer, second polymer, and third polymer materials, and chosen process conditions led to the resulting pass and block state transmission spectra measured by conventional spectrometer and shown in FIG. 3. This film has a resulting physical thickness as measured by a capacitance gauge of approximately 86.9 μm.

The shrinkage measured at 302° F. was 2.74% MD and 2.77% TD providing sufficiently isotropic behavior for this application.

Figure 4:
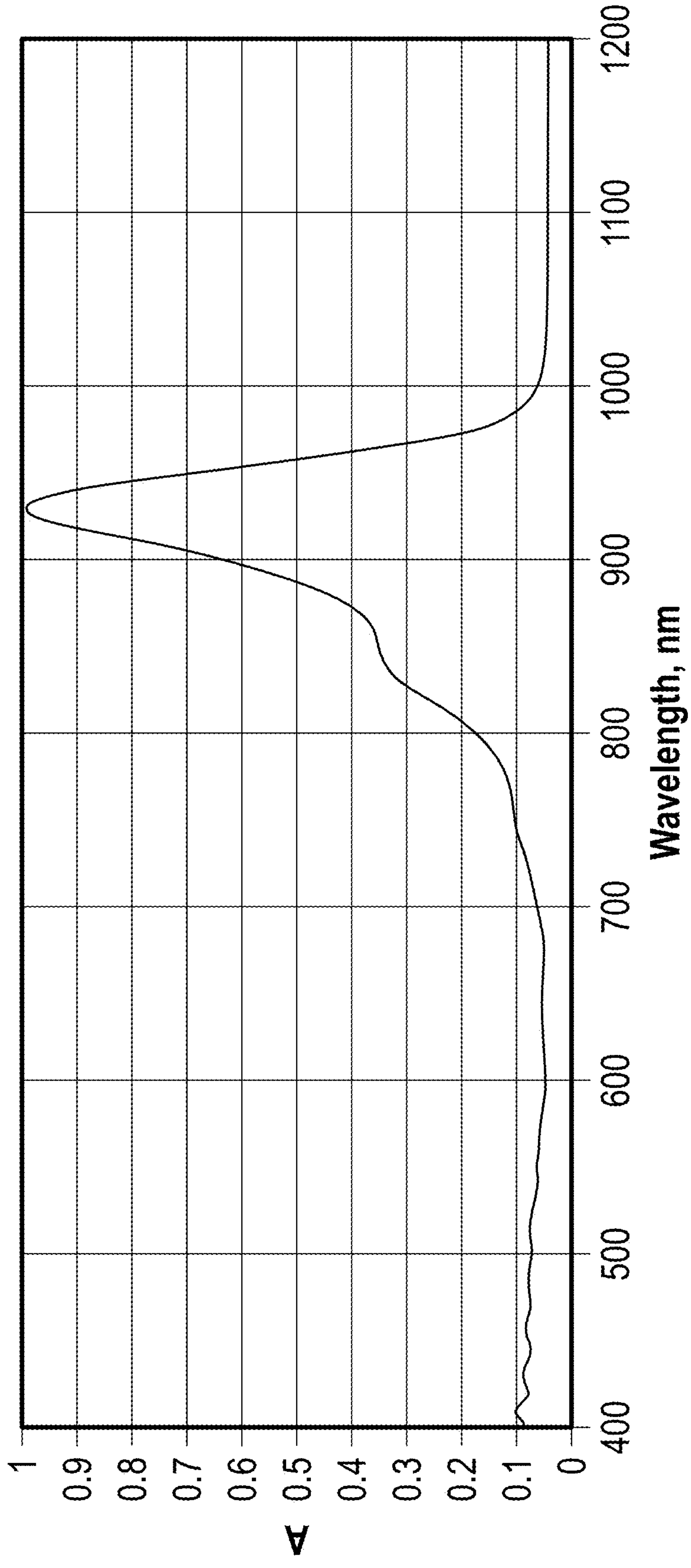
FIG. 4 is a graph showing absorbance spectra for the optical stack of Example 1.

FIG. 4 is a graph showing absorbance spectra for an example material Spectra™ 350 from Epolin which has a peak absorption spectra at 930 nm. An infrared absorber portion 20 was added to the multilayer optical film of Example 1 to provide the optical stack 100 or by coating Spectra™ 350 onto the multilayer optical film.

The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. A vehicle, comprising:

a windshield comprising:

a glass layer;

an optical stack comprising:

an infrared reflector portion; and an infrared absorber portion disposed on the infrared reflector portion;

wherein, the optical stack is disposed on or in the glass layer;

wherein for substantially normally incident light of at least a first wavelength in a first wavelength range extending at least from about 900 nm to about 1200 nm and for each of orthogonal first and second polarization states:

the infrared reflector portion reflects at least 60% of the incident light; and the infrared absorber portion absorbs at least 60% of the incident light; and a light source disposed within the vehicle and configured to emit light at the first wavelength towards the optical stack, such that the infrared absorber portion of the optical stack is disposed between the infrared reflector portion and the light source.

2. The vehicle of claim 1, wherein the light source is interfaced with an electronic control unit (ECU) of the vehicle, wherein the ECU is configured to selectively operate the light source based one or more conditions, and wherein the one or more conditions is at least one of a trigger by a user of the vehicle and a trigger from a cabin management module of the vehicle.

3. A vehicle, comprising:

a windshield comprising:

a first glass layer facing towards an exterior surface of the windshield;

an optical stack comprising:

an infrared reflector portion; and an infrared absorber portion disposed on the infrared reflector portion; and a second glass layer facing towards cabin of the vehicle;

wherein the infrared reflector portion is adjacent to the first glass layer and the infrared absorber portion is adjacent to the second glass layer;

wherein the optical stack is disposed in between the first glass layer and second glass layer;

wherein for substantially normally incident light and for at least a first wavelength in a first wavelength range extending at least from about 900 nm to about 1200 nm and for each of orthogonal first and second polarization states:

the infrared reflector portion reflects at least 60% of the incident light; and the infrared absorber portion absorbs at least 60% of the incident light; and a light source disposed in the cabin of the vehicle and configured to emit light at the first wavelength towards the optical stack, such that the infrared absorber portion of the optical stack absorbs the light to heat the windshield.

* * * * *